United States Patent [19]
Reifenhäuser

[11] Patent Number: 5,217,721
[45] Date of Patent: Jun. 8, 1993

[54] APPARATUS FOR PRODUCING A SYNTHETIC RESIN FOIL

[75] Inventor: Hans Reifenhäuser, Troisdorf, Fed. Rep. of Germany

[73] Assignee: Reifenhauser GmbH & Co. Maschinenfabrik, Troisdorf, Fed. Rep. of Germany

[21] Appl. No.: 841,337

[22] Filed: Feb. 25, 1992

[30] Foreign Application Priority Data

Mar. 1, 1991 [DE] Fed. Rep. of Germany ....... 4106486

[51] Int. Cl.⁵ .................. B29C 47/22; B29C 47/92
[52] U.S. Cl. .................. 425/72.1; 425/141; 425/381; 425/466
[58] Field of Search .......... 425/72.1, 141, 140, 425/381, 466, 133.5; 264/40.1, 40.5

[56] References Cited

U.S. PATENT DOCUMENTS

| | | | |
|---|---|---|---|
| 3,535,739 | 10/1970 | Mehnert | 425/141 X |
| 3,975,132 | 8/1976 | Keim | 425/141 X |
| 4,592,710 | 6/1986 | Reifenhauser et al. | 425/141 |
| 4,741,686 | 5/1988 | Cazzani et al. | 425/381 |
| 4,863,361 | 9/1989 | Boos | 425/381 X |
| 4,944,666 | 7/1990 | Hilke et al. | 425/140 X |
| 4,978,289 | 12/1990 | Maejima | 425/381 X |
| 5,066,435 | 11/1991 | Lorenz et al. | 264/40.5 |
| 5,110,518 | 5/1992 | Halter | 264/40.1 |

FOREIGN PATENT DOCUMENTS

| | | |
|---|---|---|
| 3427912 | 3/1986 | Fed. Rep. of Germany . |
| 3505837A1 | 8/1986 | Fed. Rep. of Germany . |
| 3740087 | 12/1989 | Fed. Rep. of Germany . |
| 4000530 | 5/1991 | Fed. Rep. of Germany . |
| 4013610A1 | 5/1991 | Fed. Rep. of Germany . |
| 4013610 | 5/1991 | Fed. Rep. of Germany . |
| 4013611 | 12/1991 | Fed. Rep. of Germany . |

*Primary Examiner*—Richard L. Chiesa
*Attorney, Agent, or Firm*—Herbert Dubno

[57] ABSTRACT

A foil-blowing head has a nozzle lip which is substantially cylindrical and of an axial length of at least several centimeters and a radial thickness of at least several millimeters. High-force servoeffectors which can be provided with stepping servomotors, speed-reduction transmissions and eccentric drivers, can act upon radial rods to deform the lip and adjust the gap width and the thickness of the foil which is produced to provide continuous thickness correction during foil blowing.

10 Claims, 5 Drawing Sheets

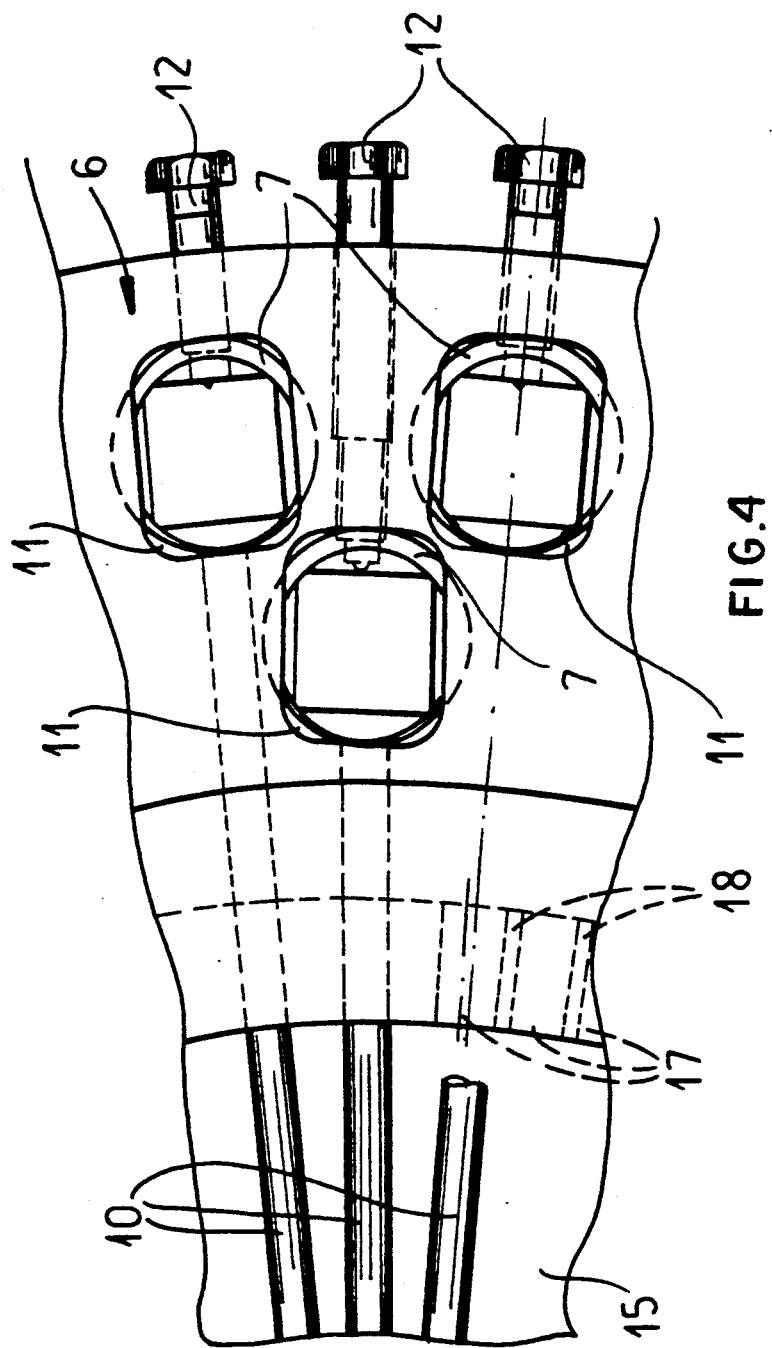

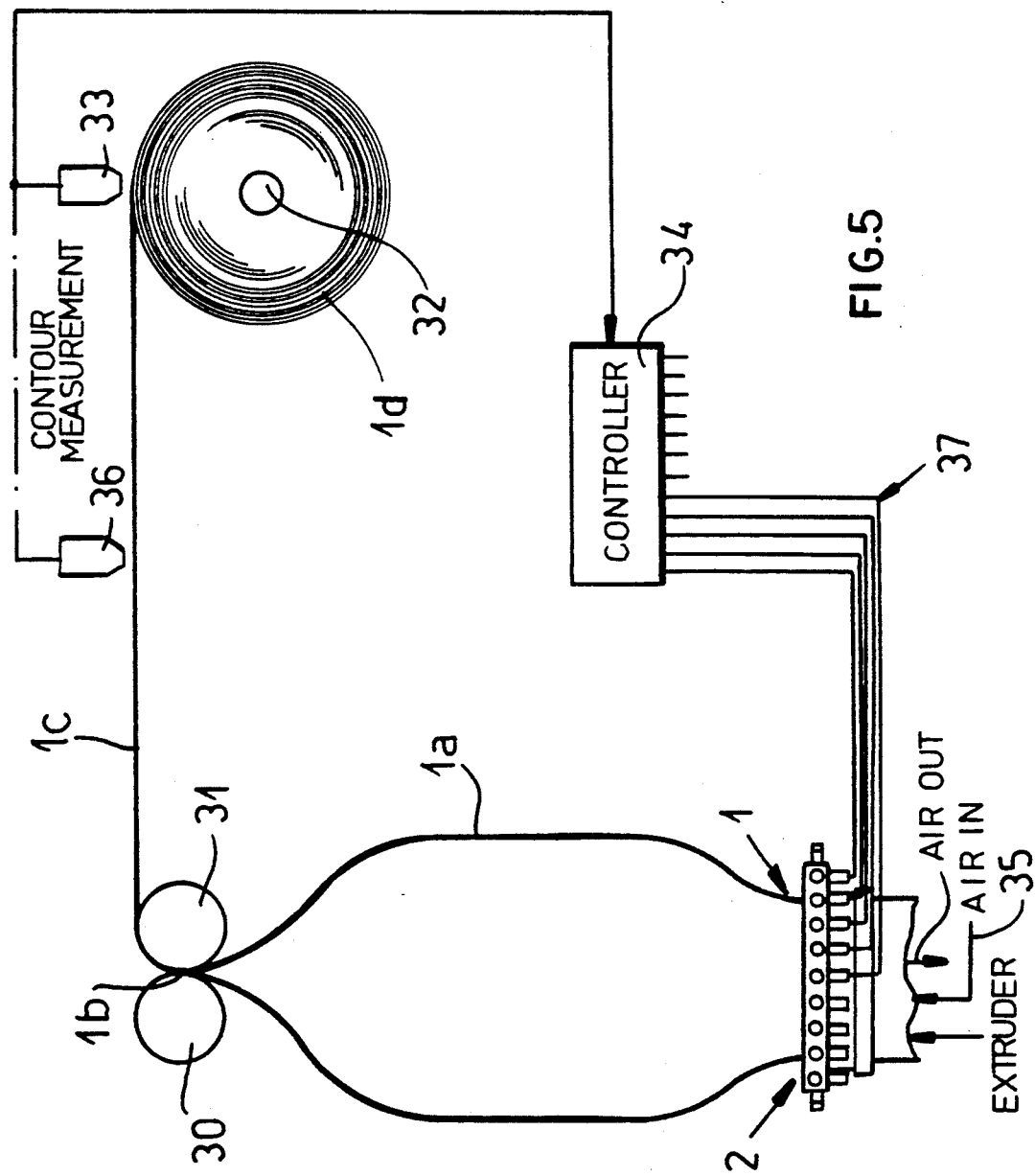

APPARATUS FOR PRODUCING A SYNTHETIC RESIN FOIL

FIELD OF THE INVENTION

My present invention relates to an apparatus for producing a plastic foil from a thermoplastic synthetic resin by a so-called foil-blowing process and, more particularly, to an apparatus for producing such a foil with thickness-error correction effected continuously during the operation. An apparatus of this type generally is provided with a blowing head formed with an angular gap nozzle or orifice through which a tube of the thermoplastic is extruded, and a device or means for blowing the tube into a foil balloon or bubble.

BACKGROUND OF THE INVENTION

In the blowing of a foil, a synthetic resin (plastic) is extruded from an angular nozzle in the form of a tube at a temperature and under conditions in which the extruded material retains its plastic state so that, upon blowing, the tube is expanded into a bubble or balloon and hence the wall thickness is reduced to a thickness of a foil. The blowing head is usually oriented vertically with the tube extruded upwardly and the balloon closed at the upper end thereof, after the foil has cooled, to close off the balloon in the nip between a pair of rollers.

The result is either a double-layer foil which can be wound into a roll or which can be split into individual layers directed in opposite directions to be wound in single-layer turns in respective rolls.

From the prior art systems serving as the systems upon which this invention is an improvement, the annular gap nozzle is formed with an outer and/or an inner nozzle lip of very limited axial length and very small thickness so that the lip can be radially deformable and can be provided (see German patent document 34 17 912 and U.S. Pat. No. 4,592,710) over its periphery with positioning elements which are equidistantly distributed and radially effective to displace the lip locally. The positioning elements are so-called field translators, i.e. electrically controllable positioning elements which are in the form of piezoelectric or magnetostrictive elements.

The result is the ability to control the orifice or gap width from which the thermoplastic tube is extruded to effect thickness correction in the foil which is ultimately formed.

This earlier system has proved to be effective in many cases, but the use of field translators has limited the versatility since they cannot generate very large forces and hence require very thin lips.

It is also known, in this context (see German patent document 40 13 610 and copending U.S. patent Ser. No. 07/598,392 filed 16 Oct. 1990 which is now U.S. Pat. No. 5,110,518) to provide an elastically-deformable nozzle lip which can be placed under prestress in the radial direction by appropriate positioning elements capable of being varied to effect thickness error correction. The use of an initial prestress which can thus be varied has been found to be especially effective for thickness control of the annular gap of the nozzle and especially local thickness adjustment.

OBJECTS OF THE INVENTION

It is the principal object of the present invention to provide an apparatus for the production of a thermoplastic foil by the foil-blowing techniques previously described and with thickness correction continuously during the foil-blowing operation which enables improvements in the thickness correction to be achieved.

Another object of the invention is to provide a system which facilitates thickness correction in foil-blowing and permits greater precision in such thickness correction to be obtained.

SUMMARY OF THE INVENTION

These objects and others which will become apparent hereinafter are attained, in accordance with the invention, in an apparatus for the production of a plastic foil from a thermoplastic synthetic resin by foil blowing which comprises:

a blowing head formed with an annular gap nozzle having inner and outer peripheral edges and supplied with the thermoplastic synthetic resin whereby a tube of the synthetic resin is extruded from the nozzle;

means for feeding a blowing fluid to the tube for blowing the tube into a foil; and thickness correction mean continuously operating during extrusion of the tube for modifying a thickness of the tube extruded from the nozzle, the thickness correction means including:

an annular elastically deformable steel lip forming one of the edges and defining an extrusion gap with the other of the edges, the lip being substantially cylindrical with an axial length of at least several centimeters and a thickness of at least several millimeters, a multiplicity of angularly equispaced radially effective high-force servoeffectors distributed around the lip and bearing upon the lip for applying a radial prestress to the lip and locally setting an initial thickness at each high-force servoeffector, and control means operatively connected to the high-force servoeffectors, responsive to thickness errors in a foil produced by the head and varying the prestress at the respective high-force servoeffectors to effect correction of the thickness errors.

It is important, for the purposes of the present invention, that the nozzle lip be a substantially cylindrical element having an axial length of at least several centimeters and a thickness of at least several millimeters and to be elastically deformable by the high-force servoeffectors which are equidistantly distributed around this lip and are effective in the radial direction to apply a prestress to the lip which can be varied by the control device for thickness correction.

The high-force servoeffectors are preferably disposed in the region of the upper edge of the lip and because of the construction of the lip from steel, practically only the region of this upper edge is placed under prestress.

Preferably, the control device forms part of a thickness profile control unit designed so that in the winding of the blown foil in a roll, the coil or roll remains free from barrel-like bulges which can result from thickness-error accumulation at certain regions of the foil upon the winding or rolling up thereof.

The blown foil can be flattened and wound up in the roll in a double-layer form or can be divided by longitudinal slitting so that individual layers can be wound up.

The thickness-error control can be effected as described in German patent document 37 40 087 and/or German patent document 37 40 088 and U.S. Pat. No. 4,911,868, utilizing features as described in German patent documents 40 00 530 and 40 13.611 (U.S. application Ser. No. 07/688,927 filed 19 Apr. 1991).

For the purposes of this description, high-force servoeffectors will be understood to be positioning elements which can be operated with high-load-variation frequency and correspondingly short setting times and can maintain the force applied for long periods without variation to the respective local region of the nozzle lip with its comparatively high thickness as described to provide the presetting.

Since the flexibility of the lip is limited by its comparatively high thickness and the forces which are applied for prestress and for adjustment of the local gap width, the extruded tube thickness of the tube can be effected with very little delay and can hold extremely narrow tolerances.

The wall thickness of the lip is preferably 3 to 5 mm and its axial length approximately 30 to 60 mm in the best mode embodiment of the invention.

Advantageously, the high-force servoelements each include an angularly displaceable eccentric driven by a servomotor through a stepdown transmission and motor. The eccentric driver can act upon a positioning rod which bears against the lip.

The unit of servomotor, stepdown transmission and eccentric driver can be received in a hole or opening in the extruder die and can be disposed between an adjusting screw and the respective rod.

The servomotor is preferably formed as a stepping motor and to minimize friction between the eccentric driver and its rod, a roller bearing is provided between the eccentric and the rod. The lip itself can provide the restoring spring action which works to reset the rod and the eccentric driver against the force applied by the servomotor.

Advantageously, the lip is an outer lip of the nozzle and is surrounded in the blowing head by an annular space which itself may be several centimeters deep and wide, this annular space limiting heat-transfer between the lip and the outer crown of the blowing head. The bottom region of the space provides the connection between the lip and the crown and can be in one piece therewith and designed with holes and narrow webs to minimize conductive heat-transfer therethrough. The servomotor units can be received in the holes. This construction makes the lip practically insensitive to thermal expansion and contraction phenomena or makes any thermal expansion and contraction phenomena easily nullified by the control means.

The control can include a computer which can take this limited expansion and contraction effect into consideration.

The holes and the units can be provided in two circles with the holes of one circle staggered relative to the holes of the other. In this embodiment, where the rods extend radially to the lip, an especially large number of units can be distributed around the lip. The rods themselves can be composed of a material of low thermal conductivity and low coefficient of thermal expansion, for example, a ceramic.

The parts of the blowing head can be fabricated separately and assembled together. However, in a preferred or best mode embodiment of the invention, the nozzle lip and blowing head crown form a one-piece construction in which the annular space is provided. This one-piece structure is preferably formed with a collar which can be centered on a lower portion of the blowing head by means of adjusting screws.

BRIEF DESCRIPTION OF THE DRAWING

The above and other objects, features and advantages of the present invention will become more readily apparent from the following description, reference being made to the accompanying drawing in which:

FIG. 4 is a plan view of a portion of the assembly of FIG. 2; and

FIG. 5 is a side view showing a foil-blowing system utilizing the features of FIGS. 1–4.

DETAILED DESCRIPTION OF THE PREFERRED EMBODIMENT

Figure 1:
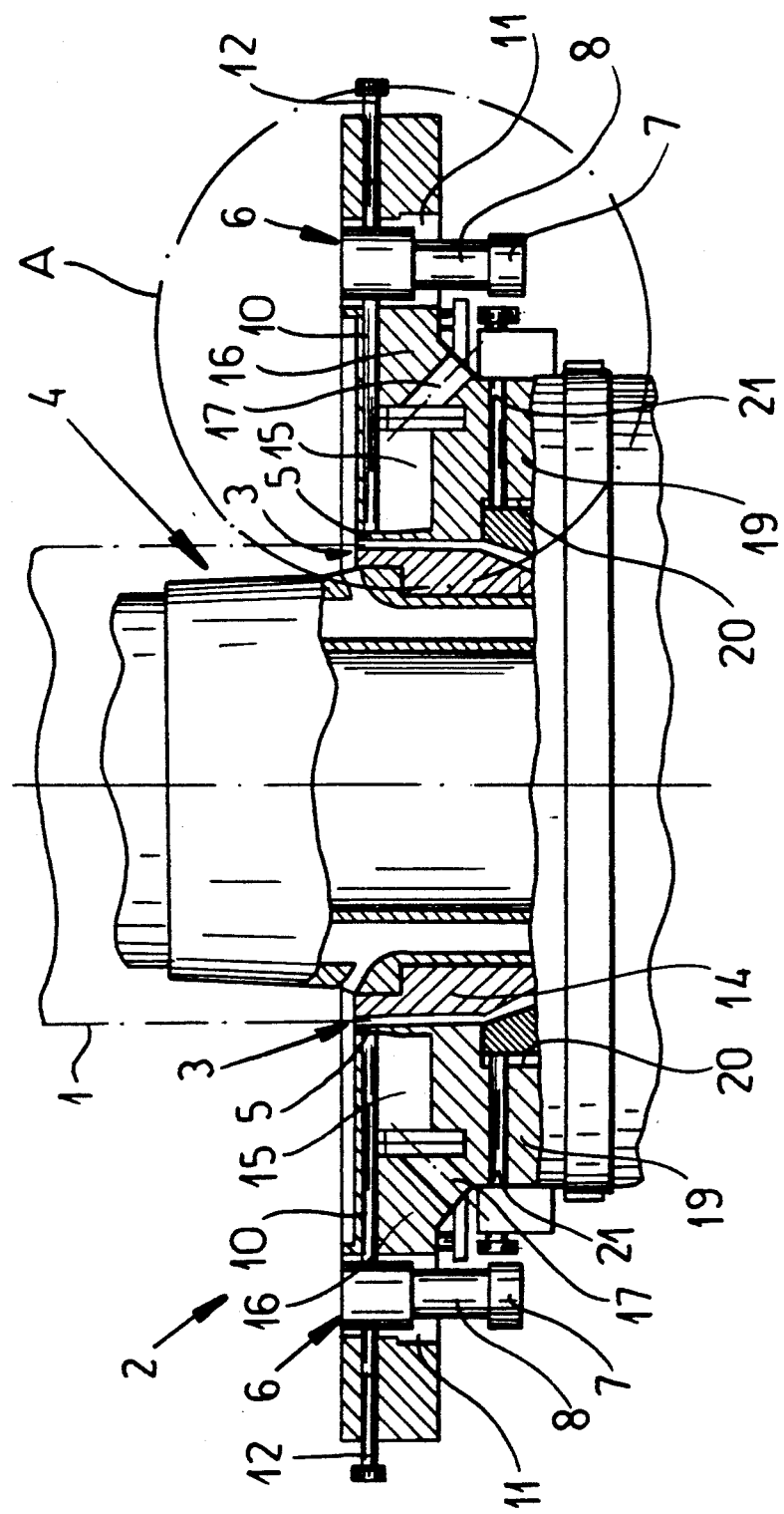
FIG. 1 is a diagrammatic axial section through a portion of a blowing head according to the invention.

As can be seen from FIG. 5, a bubble or balloon 1a of a plastic foil can be formed by extruding a tube 1 from a foil-blowing head 2, expanding that tube with air introduced into the blowing head by suitable means represented at 35, thereby reducing the wall thickness of the tube to the thickness of the desired foil, flattening the foil between the rolls 30 and 31 through nip of which the foil passes at 1b and rolling up the double-layer foil 1c at 1d on a roll mounted upon a shaft 32.

In this case, the double-layer foil is wound up directly on the roll 1d. Alternatively, the foil can be longitudinally slit and one layer rolled up to the right while the other layer is rolled up to the left. In either case, a contour-measuring unit 33 may be provided on the roll to measure the contour of the roll which is formed. Alternately and as shown diagrammatically at 36, a thickness-measuring device may scan across the width of the foil to measure the thickness. To avoid bulges in the roll, the thickness of the foil should be kept as uniform as possible (see the aforementioned patent documents) and to that effect, a thickness correction is effected. The sensors 33 and 36 feed a computer controller 34 which outputs control signals to the high-force servoeffectors of the head 2 to be described in greater detail below.

The signal line connected to the servoeffectors, for example, the line delivering the pulses to the stepping motors thereof are represented at 37 in FIG. 5. The extrusion gap width is locally varied under the control of the computer controller 34 upon the detection of a thickness variation to restore the set point thickness of the tube and hence of the foil, thereby preventing the development of barrel-like bulges in the roll 1d.

In FIG. 1, the thermoplastic tube about to be expanded by air introduced into the tube is represented at 1. The production of the plastic foil is effected with a thickness-error correction continuously during operation utilizing the means shown in greater detail in FIGS. 1–4.

The blowing head 2 is provided with an annular gap nozzle 3 and a device 4 for blowing the foil balloon or bubble.

Figure 2:
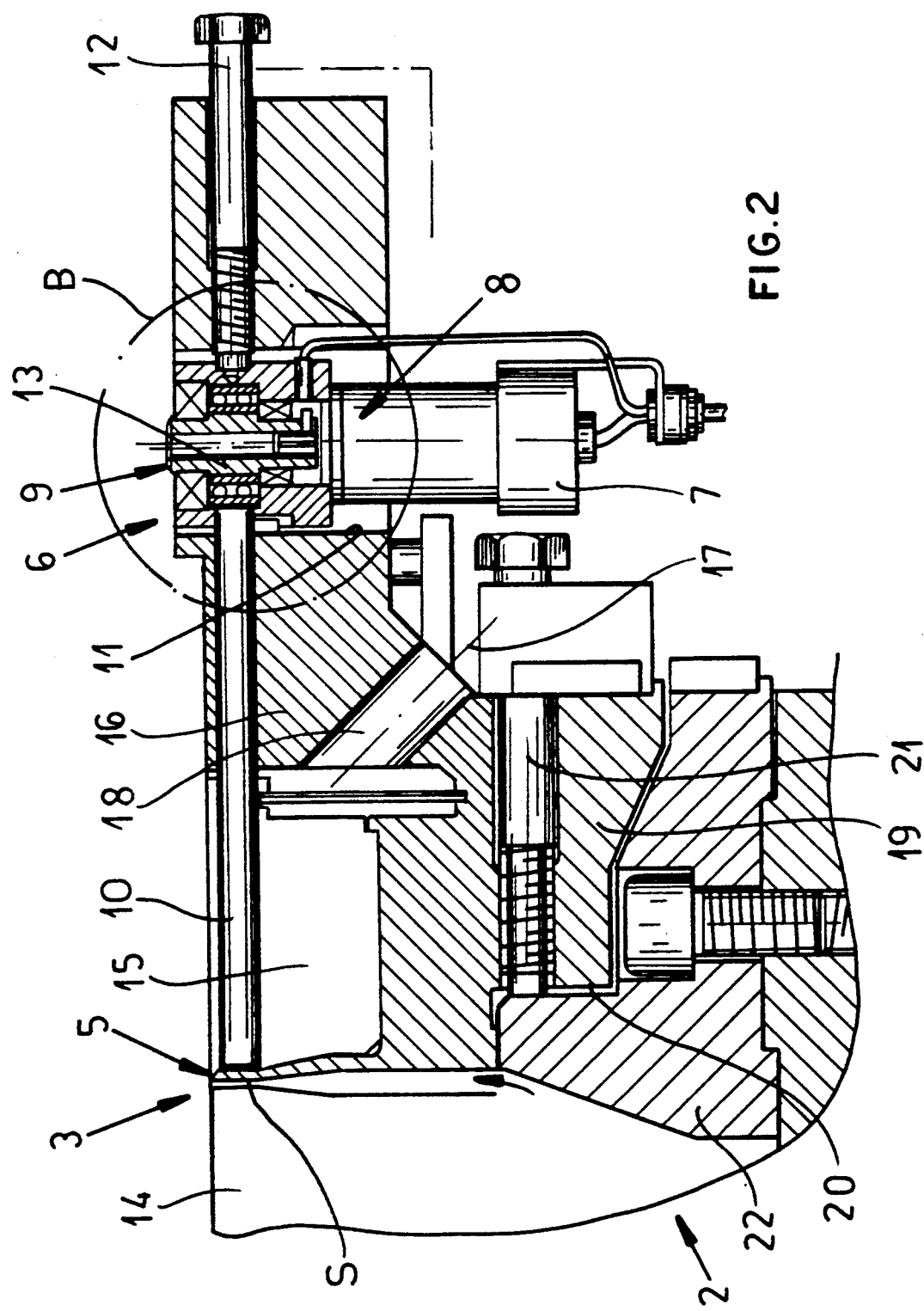
FIG. 2 is a detail of the region A of FIG. 1 drawn to a larger scale.

As is especially apparent from FIG. 2, the annular gap nozzle 3 can have an outer lip 5 composed of steel. The lip 5 is formed as a substantially cylindrical element of at least several centimeters in axial length and at least several millimeters in thickness. In the preferred embodiment, the thickness of the lip 5 is between 3 and 5 mm and its axial length is between 3 and 6 cm.

About the periphery of the lip, a multiplicity of high-force servoelements 6 (servoeffectors) are equidistantly distributed and extend radially (see especially FIGS. 2 and 4).

The gap width of the nozzle is represented at S and is adjusted locally by the application of a prestress to the lip 5 in the radial direction, i.e. by inward deformation of the lip, brought about by the high-force servoeffectors 6. Since this is a radial deformation, the prestress is here a compressive prestress. The high-force servoeffectors 6 form part of the control device for thickness-error correction shown in FIG. 5, for example, at 33, 34, 36, 37 or an equivalent thickness correction system from the patent documents referred to above.

The thickness correction is effected by changing the prestress at the respective localities around the lip via the respective high-force servoelements 6.

The high-force servoelements 6 act upon the upper edge of the lip 5 so that practically only the region of the upper edge is placed under prestress.

Figure 3:
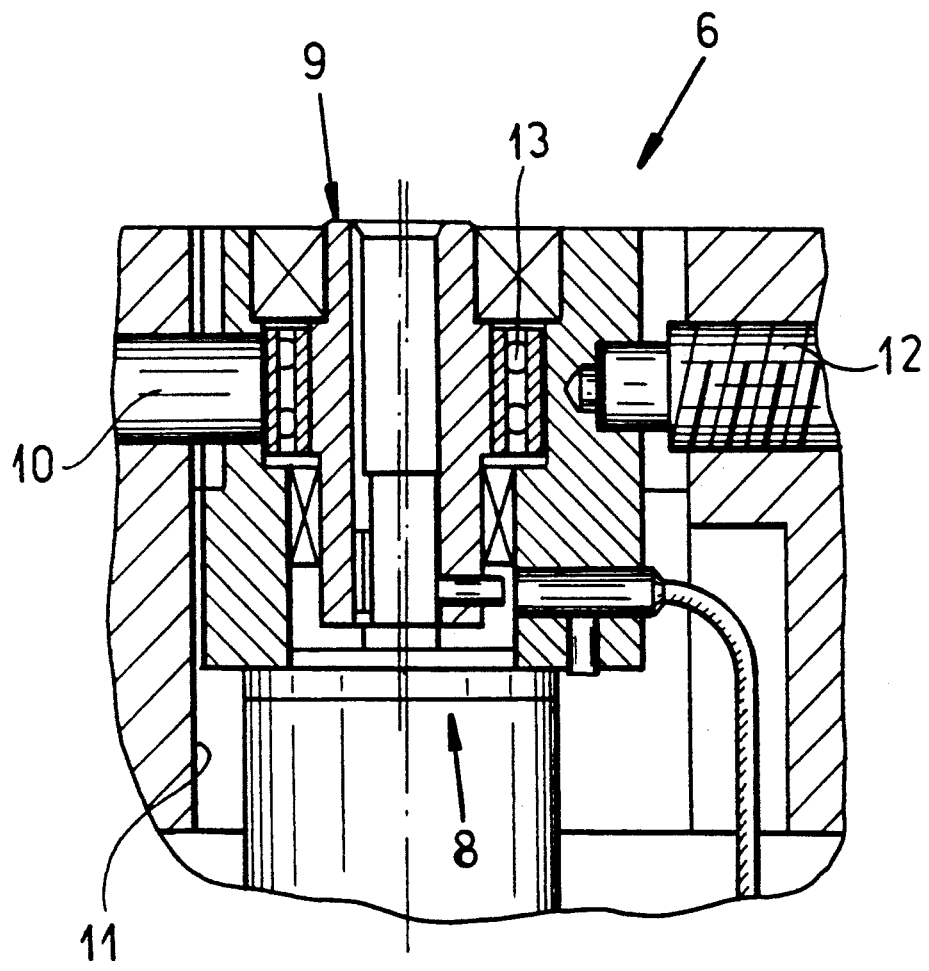
FIG. 3 is a detail of the region B of FIG. 2 to still a larger scale.

As a comparison of FIGS. 2 and 3 will show, each of the high-force servoelements 6 can include a servomotor 7 whose output is an angular displacement output driving a step-down transmission 8 which, in turn, operates a driver 9 acting upon a force-transmitting rod 10 which bears upon the lip.

The assembly of servomotor 7, step-down transmission 8 and driver 9 is a unit which is received in a receptacle 11 of the blowing head between the respective rod 10 and adjusting screw 12 threaded into a crown 16 of this head. The servomotor 7 is a stepping motor operated by a pulse train from the computer controller 34.

The driver 9 is an eccentric which applies force to the rod 10 via a roller bearing 13 designed to reduce friction between the driver and the rod 10. The resiliently deformable lip 5 also functions as a restoring spring as mentioned above.

The lip 5 is an outer lip of the nozzle surrounding the blowing head core 14. This lip 5 is separated from the crown 16 by an annular space 15 which is several centimeters in depth and width, but is formed in one piece with the bottom of the annular space 15 and the crown 16. To reduce the heat transfer, the floor of the annular space 15 is provided with holes or bores 17 and thin webs 18 between the holes.

It should be clear from FIG. 4 that the units consisting each of a servomotor 7, a step-down transmission and a driver 9 are oriented in two circles around the lip 5 and in each circle the units are offset from the units of the other circle.

The rods 10 extend radially to the lip 5. The staggering of the units allows the rods 10 to be closely adjoining one another and hence the adjustment of the lip 5 to be effected at very small circumferential segments around the lip.

The one-piece body formed by the lip 5 and the crown 16 and in which the annular space 15 is provided, has a collar 19 which can be centered on a lower part 22 of the blowing head across a centering gap 20 by centering screws 21. In operation, of course, the servomotors are stepped in response to the detection of thickness errors to effect local changes in the prestress around the lip to restore the set point thickness of the tube and the foil.

I claim:

1. An apparatus for the production of a plastic foil from a thermoplastic synthetic resin by foil blowing, said apparatus comprising:

a blowing head formed with an annular gap nozzle having inner and outer peripheral edges and supplied with said thermoplastic synthetic resin whereby a tube of said synthetic resin is extruded from said nozzle;

means for feeding a blowing fluid to said tube for blowing said tube into a foil; and thickness correction means continuously operating during extrusion of said tube for modifying a thickness of the tube extruded from said nozzle, said thickness correction means including:

an annular elastically deformable steel lip forming one of said edges and defining an extrusion gap with the other of said edges, said lip being substantially cylindrical with an axial length of at least several centimeters and a thickness of at least several millimeters, a multiplicity of angularly equispaced radially effective high-force servoeffectors distributed around said lip and bearing upon said lip for applying a radial prestress to said lip and locally setting an initial thickness at each high-force servoeffector, said high-force servoeffectors including a servomotor with an angularly displaceable driver driven through a step-down transmission, and a rod displaceable by said driver and bearing upon said lip, said servomotor being a stepping motor, said driver being an eccentric, wherein each servomotor, the respective driver and the respective rod forms a unit receivable in a respective compartment between the respective rod and a respective adjusting screw, and said lip developing sufficient restoring force upon stressing to act as a restoring spring for said drivers and the respective rods, and control means operatively connected to said high-force servoeffectors, responsive to thickness errors in a foil produced by said head and varying said prestress at the respective high-force servoeffectors to effect correction of said thickness errors.

2. The apparatus defined in claim 1 wherein said head is oriented with an upright axis and said nozzle opens upwardly, said high-force servoeffectors being disposed in a region of an upper edge of said lip and applying said prestress substantially only to said upper edge of said lip.

3. The apparatus defined in claim 1 wherein aid control means include means for monitoring a thickness profile against said web, said thickness correction being effected to enable coiling of said web in a roll free from bulges.

4. The apparatus defined in claim 1, further comprising a roller bearing interposed between each eccentric and the respective rod and adjusting screw.

5. The apparatus defined in claim 1 wherein said lip is disposed along said outer edge, said lip being surrounded by an annular space having a depth of several centimeters and a radial width of several centimeters in said head and separating a crown of said head from said lip, said crown being connected to said lip by a region of reduced thermal conductivity, forming a bottom for said space and in which said units are receivable.

6. The apparatus defined in claim 5 wherein said rods bridge across said space.

7. The apparatus defined in claim 6 wherein said region of reduced thermal conductivity is provided with an array of bores and thin webs between said bores.

8. The apparatus defined in claim 7 wherein said units are arrayed in two circles and are angularly offset from one of said circles to the other of said circles, said rods extending radially to said lip.

9. The apparatus defined in claim 8 wherein said crown is formed in one piece with said lip and said annular space and said bores are formed in said one piece.

10. The apparatus defined in claim 9 wherein said one piece is formed with a collar defining a gap with a lower portion of said head and centered with respect to said lower portion by a plurality of angularly spaced centering screws.

* * * * *